US010547443B2

(12) United States Patent
Chen et al.

(10) Patent No.: US 10,547,443 B2
(45) Date of Patent: Jan. 28, 2020

(54) SESSION KEY EXCHANGE AS A SERVICE (71) Applicant: Red Hat, Inc., Raleigh, NC (US)

(72) Inventors: Huamin Chen, Westboro, MA (US); Jay Vyas, West Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 276 days.

(21) Appl. No.: 15/604,586

(22) Filed: May 24, 2017

(65) Prior Publication Data

US 2018/0343115 A1 Nov. 29, 2018

(51) Int. Cl.
*H04L 29/06* (2006.01)
*H04L 9/08* (2006.01)
*H04L 9/32* (2006.01)

(52) U.S. Cl.
CPC .......... *H04L 9/0825* (2013.01); *H04L 9/0844* (2013.01); *H04L 9/3213* (2013.01)

(58) Field of Classification Search
CPC .... H04L 9/0844; H04L 9/0825; H04L 9/3213
See application file for complete search history.

(56) References Cited

U.S. PATENT DOCUMENTS

| 7,526,649 | B2 | 4/2009 | Wiseman et al. |
| 7,971,240 | B2 | 6/2011 | Guo et al. |
| 8,510,559 | B2 | 8/2013 | Guccione et al. |
| 8,549,283 | B2 | 10/2013 | Lim |
| 2005/0182933 | A1* | 8/2005 | Ritz ............... G06F 17/2247 713/168 |
| 2006/0046690 | A1 | 3/2006 | Rose et al. |
| 2012/0189122 | A1* | 7/2012 | Huang ............... H04L 9/0844 380/270 |
| 2015/0019442 | A1 | 1/2015 | Hird et al. |

OTHER PUBLICATIONS

Chang Lui et al., CCBKE—Session Key Negotiation for Fast and Secure Scheduling of Scientific Applications in Cloud Computing, https://eprint.iacr.org/2012/385.pdf, Faculty of Engineering and Information Technology, University of Technology, Sydney, Australia, School of Computer Science and Software Engineering, The University of Western Australia, Australia, 2012, 16 pages, Australia.
L. Zhu et al., Kerberos Cryptosystem Negotiation Extension, Standard Track, Microsoft Corporation, https://tools.ietf.org/html/rfc4537, Jun. 2006, 7 page.

(Continued)

*Primary Examiner* — Dao Q Ho
(74) *Attorney, Agent, or Firm* — Lowenstein Sandler LLP (57) ABSTRACT An example method may include receiving, at a session key service, a first session key and a first public key of a client device to be authenticated to a web server. The first session key being encrypted by the client device using a second public key of the web server. The web server is a subscriber of the session key service hosted in a cloud-based environment. The method may also include decrypting, using a first private key of the web server, the first session key to obtain a plaintext session key, encrypting the plaintext session key using the first public key of the client device to generate a second session key, and sending the second session key to the web server to facilitate a decryption of the second session key by the client device for an authentication of the client device to the web server.

19 Claims, 7 Drawing Sheets

(56) References Cited

OTHER PUBLICATIONS

Limitations of the Kerberos Authentication System, http://pages.cs.wisc.edu/~thanhdo/qual-notes/ps/ps1-kerberos.txt, 5 pages.
Avi Kak, Lecture 10: Key Distribution for Symmetric Key Cryptography and Generating Random Numbers, https://engineering.purdue.edu/kak/compsec/NewLectures/Lecture10.pdf, Purdue University, Feb. 10, 2017, 65 pages.

* cited by examiner

SESSION KEY EXCHANGE AS A SERVICE

TECHNICAL FIELD

The present disclosure is generally related to networking, and is more specifically related to enhancing performance and security of establishing secure communication with web servers by using session key exchange as a service in a cloud-based environment.

BACKGROUND

Secure communication (e.g., using Hyper Text Transfer Protocol Secure (HTTPS)) between browsers and websites served by web servers is becoming more prevalent. For example, some web browsers mandate that the websites served by web servers implement secure protocols, such as HTTPS, for every communication made with the browsers. However, the HTTPS connection establishment may include a session key exchange between the web server serving the website and the browser accessing the website on the client device. Session key exchanges may include encrypting, decrypting, and/or generating session keys, which may be computationally expensive.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

As noted above, implementing a secure connection using HTTPS for every communication between a client device and a web server may be taxing on the web server due to computationally expensive session key exchanges. In some instances, latency on websites may be experienced by users due to the session key exchanges when high traffic is occurring on the web server. As a result, the website may lose web traffic. Additionally, during the session key exchange, any web server used to serve the website has access to a private key of the website provider. If any of the web servers are breached, the private key may be exposed and the website may be at jeopardy.

Conventionally, establishing a secure connection (e.g., using HTTPS) between a browser executing on a client device and a website served by a web server may begin with a handshake between the client device and the web server. The handshake may include at least a session key exchange between the client device and the web server. The browser executing on the client device may access the website served by the web server and extract a public key of the web server. The client device may generate a session key, which may be a certain number of bytes (e.g., 64, 128, 192, 256), and encrypt the session key with the public key of the web server. Then, the client device may send the encrypted session key and a public key of the client device to the web server.

The web server may decrypt the encrypted session key into plaintext with a private key of the web server. The decryption may consume numerous processing resources and time due to the length of the computation to decrypt the encrypted session key. In some instances, the web server may generate an additional session key that it combines with the decrypted plaintext session key to obtain a combined session key. Generating the additional session key further inundates the web server from a processing perspective, which may hinder the amount of client devices that can be served. In either scenario, the plaintext session key or the combined session key may be encrypted by the web server using the public key of the client device to generate a second encrypted session key. The client device sends the second encrypted session key to the client device, and the client device decrypts the second encrypted session key using a private key of the client device. The client device may then determine whether the decrypted session key matches the session key originally generated by the client device and previously sent to the web server. If the session key that is received matches the session key that was sent, then authentication is complete between the client device and the web server. The client device and the web server may begin using the verified session key for subsequent requests and responses.

As may be appreciated, as more client devices access the website served by the web server, the web server may become unable to support high volumes of traffic due to encryption, decryption, and/or generation of session keys. In some instances, the session key exchange latency experienced using the above-described technique may significantly reduce connection per second (CPS) between the client device and the web server. Further, as noted above, session key exchanges use the private key of the web server during authentication. In a distributed environment, every HTTPS compliant web server serving a particular website in a network may have access to the private key. If any of the web servers are breached, the private key may be exposed and the website may be at jeopardy.

Accordingly, some implementations of the present disclosure relate to improving the performance of establishing secure connections and security of maintaining the private key of the web server by using a session key service hosted in a cloud-based environment. The session key service may be implemented as a session key as a service (SKaaS) endpoint that uses a subscription model. For example, various web servers may subscribe to the session key service by starting a subscription (e.g., service level agreement (SLA)). The subscription may specify various metrics that the session key service fulfills throughout the lifetime of the subscription. The metrics may include, for example, a session key exchange rate (e.g., 10,000 session keys a second) for the session key service, a maximum number of secure channels that can be open at a time, and so forth.

In an implementation, the session key service may handle the session key exchanges for the web server, thereby improving the performance of the web server and allowing the web server to support higher volumes of connections with client devices. That is, in some implementations, when the web server receives an encrypted session key from the client device, the web server may forward the encrypted session key to the session key service without performing decryption, encryption, and/or generation of session keys. The client device may be unaware that the web server is not performing the session key exchanges. The cloud-based environment may include a multitude of hardware resources (e.g., servers) and application resources (e.g., optimized applications) in one or more data centers dedicated to processing the session key exchanges for the session key service. Also, the session key service may maintain the private key of the web server using a security model that supports globally distributed subscribers and protects credentials of subscribers and private keys.

Figure 1:
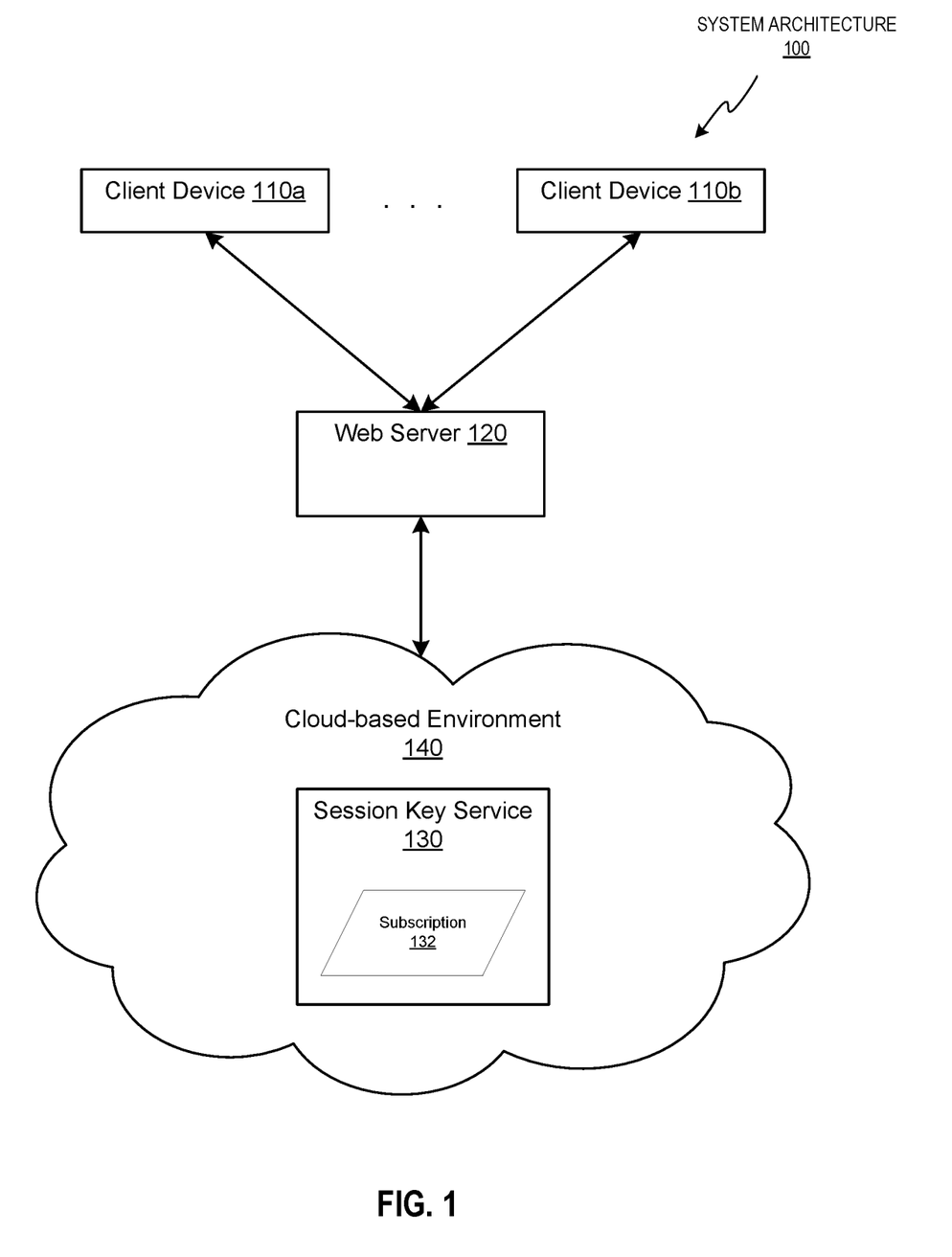
FIG. 1 depicts a high-level diagram of an example system architecture operating in accordance with one or more aspects of the present disclosure.

FIG. 1 depicts a high-level diagram of an example system architecture 100 operating in accordance with one or more aspects of the present disclosure. It should be noted that other architectures are possible and that the implementation of a system utilizing embodiments of the disclosure are not necessarily limited to the specific architecture depicted. The system architecture 100 may include one or more client devices 110a and 110b in communication with a web server 120 via a network. Further, the web server 120 is connected to a session key service 130 that is hosted in a cloud-based environment 140. The network may be a public network (e.g., the Internet), a private network (e.g., a local area network (LAN) or wide area network (WAN)), or a combination thereof. The network may include a wireless infrastructure, which may be provided by one or more wireless communications systems, such as a wireless fidelity (WiFi) hotspot connected with the network and/or a wireless carrier system that can be implemented using various data processing equipment, communication towers, etc. Additionally or alternatively, networks may include a wired infrastructure (e.g., Ethernet).

Although just two client devices 110a and 110b are depicted, it should be understood that numerous (e.g., hundreds, thousands, tens of thousands, hundreds of thousands, millions, etc.) of client devices may be connected to the web server 120. The client devices 110a and 110b may include any suitable computing device, such as a laptop, tablet, smartphone, personal digital assistant (PDA), desktop, server, or other portable or non-portable devices. The client devices 110a and 110b interact with the web server 120 by exchanging messages via one or more communication protocols. For example, an application executing on the client devices 110a and 110b may be a web browser that implements a secure communication protocol, such as HTTPS. As such, the browser may just enable communicating with web servers that are compliant with the secure communication protocol. If a web server is not compliant, the browser may display a message indicating such and that a website served by the particular web server should not be trusted. In the depicted system architecture 100, it is to be understood that the web server 120 is compliant with the secure communication protocol (e.g., HTTPS).

The cloud-based environment 140 may include numerous hardware resources, such as processing devices (e.g., servers) and memory, and application resources operating on those hardware resources in a distributed environment. The hardware and application resources may be optimized for session key exchanges (e.g., encryption, decryption, and/or generation). For example, the cloud-based environment may distribute the workload of processing the session key exchanges among numerous hardware and application resources to enable concurrency and faster performance. The hardware and application resources may be included in one or more data centers and connected via a network.

The session key service 130 may implement a security model that supports globally distributed subscribers and protects credentials and private keys of subscribers. Also, the session key service 130 may implement a subscription model. The hardware and application resources may be dedicated to fulfilling the metrics set forth in a subscription 132 maintained by the session key service 130. The subscription 132 may specify the metrics that the session key service 130 is to fulfill for the web server 120. Although one subscription 132 is depicted, it should be understood that the session key service 130 may maintain numerous subscriptions for numerous subscribers (e.g., web servers). The subscription 132 may specify metrics for the session key exchange rate to be provided by the session key service 130, the number of secure channels to open with the web server 120, and the like. The session key service 130 may be implemented as computer instructions stored one or more tangible, non-transitory computer-readable media of the cloud-based environment 140 and executed by one or more processing devices 140 of the cloud-based environment. The session key service 130 may be exposed to its subscribers (web server 120), for example, via an application programming interface (API).

As described in more detail below, the session key service 130 may handle session key exchanges for the web server 120 using the subscription model and may protect the security of the private key of the web server. The subscriptions 132 may add value for providers of websites served by the web servers because the session key service 130 is committed to fulfilling the metrics set forth in the subscriptions 132. In some implementations, subscribers may entrust their private key with the session key service 130 or adopt a homomorphic encryption scheme that involves the session key service 130 generating session keys without having the private key of the subscribers in plaintext. Further, since the session key service 130 just communicates with the web server 120, the privacy of the client devices 110a and 110b may be maintained by the web server 120.

Figure 2:
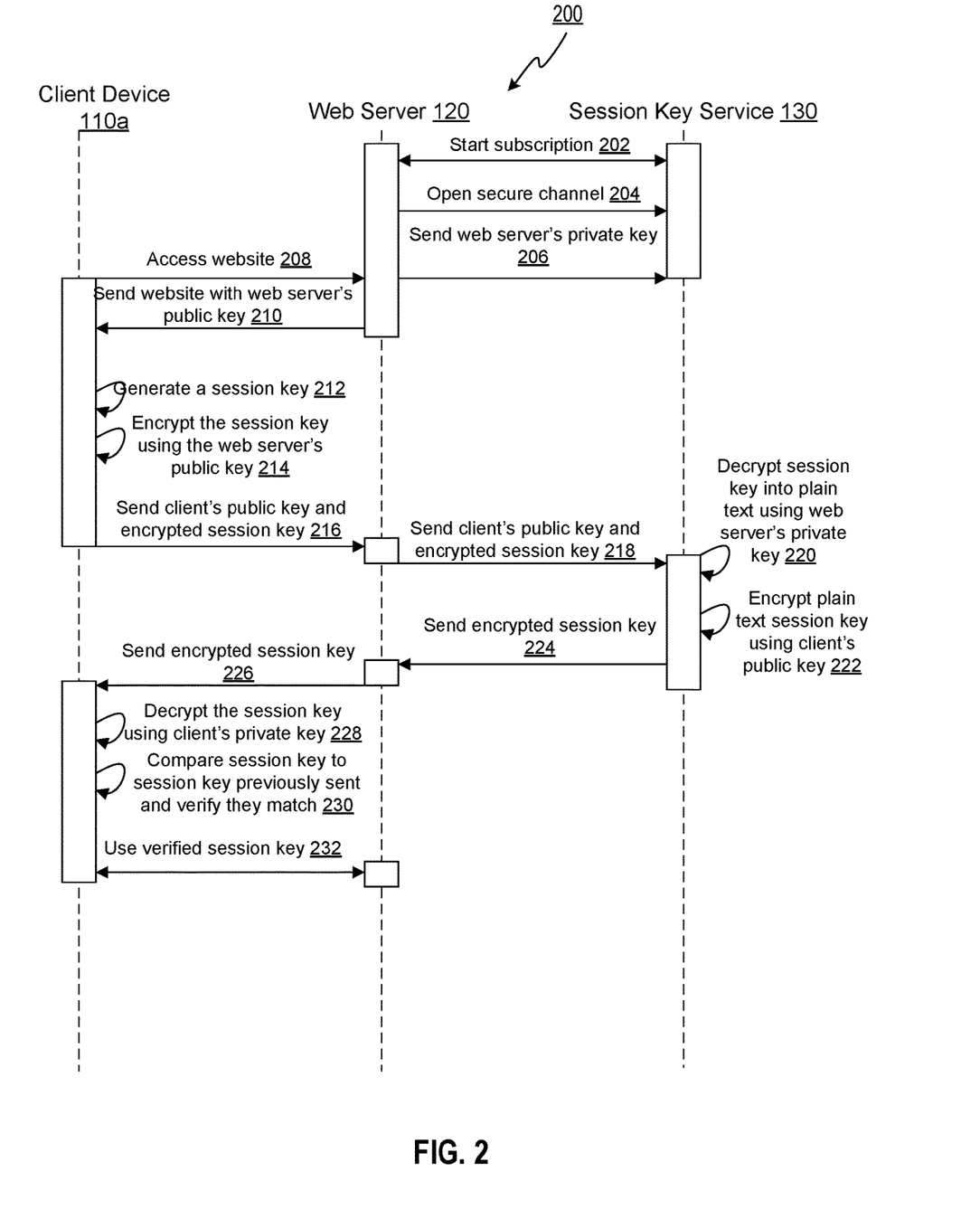
FIG. 2 depicts a sequence diagram for exchanging one or more session keys using a session key service in accordance with one or more aspects of the present disclosure.
Figure 3:
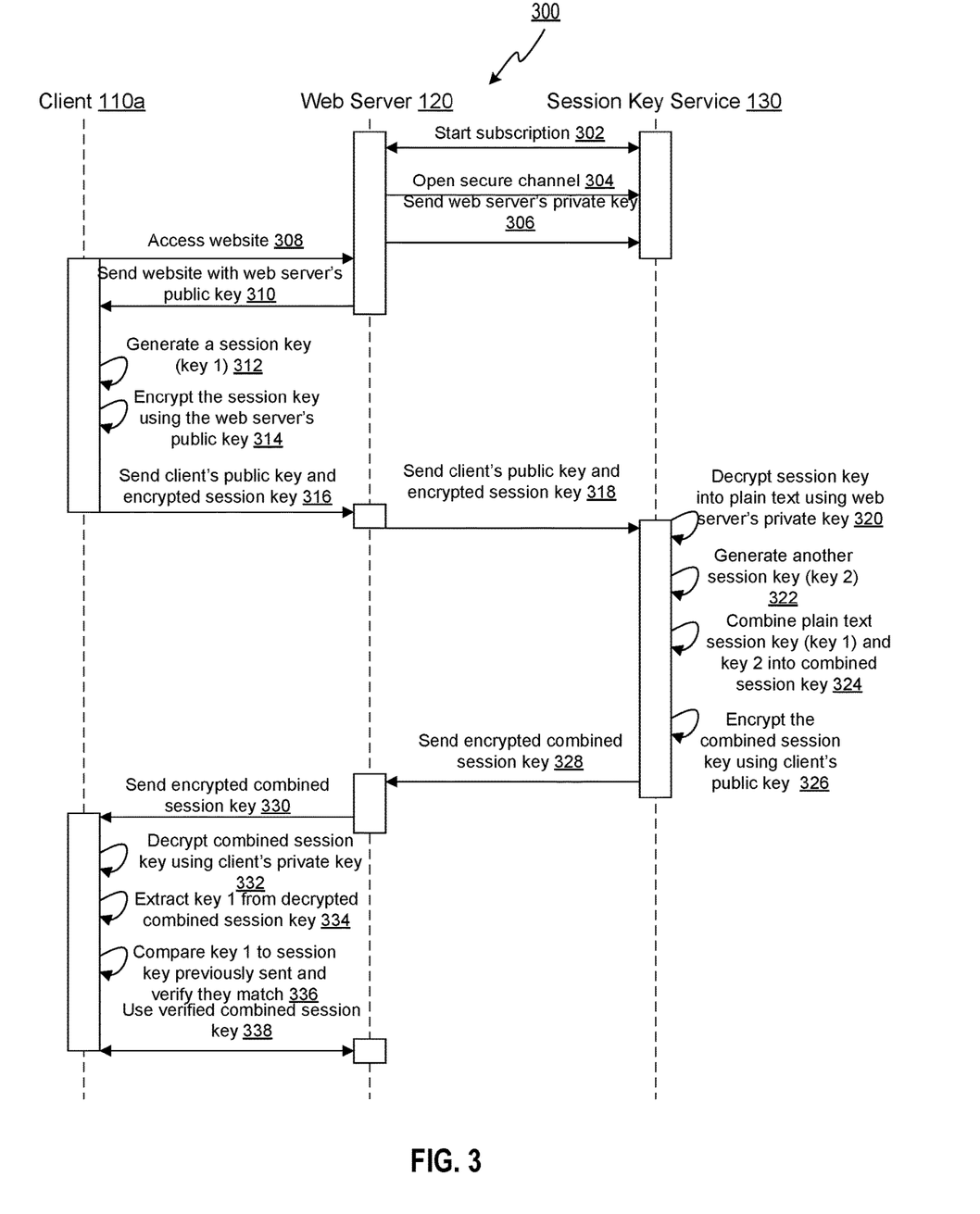
FIG. 3 depicts another sequence diagram for exchanging one or more session keys using a session key service in accordance with one or more aspects of the present disclosure.

FIG. 2 and FIG. 3 depict sequence diagrams 200 and 300 for exchanging one or more session keys using the session key service 130 in accordance with one or more aspects of the present disclosure. As depicted, the sequence diagrams 200 and 300 include interactions between the client device 110a, the web server 120, and the session key service 130. The following discussion references asymmetrical public/private key pair encryption, where one entity uses a public key for encryption and another entity uses a private key (different from the public key) for decryption, and also symmetrical session key encryption where a session key is shared by a sender and receiver for encryption and decryption. It should be noted that the web server 120 has subscribed to the session key service 130 and a subscription 132 is created and maintained by the session key service 130 in both sequence diagrams 200 and 300. Further, it should be understood that the web server does not perform any encryption, decryption, and/or generation of session keys in the depicted sequence diagrams 200 and 300. Instead, the session key exchange service 130 handles the session key exchanges and the performance of the web server 120 may be enhanced, thereby enabling handling higher volumes of client devices.

Beginning with FIG. 2, the sequence may begin with the web server 120 and the session key service 130 starting (202) the subscription 132. The web server 120 may open (204) a secure channel (e.g., tunnel) with the session key service 130 in response to the subscription 132 starting. In an implementation, the session key service 130 may identify the metric for the maximum number of secure channels that can be open at a time in the subscription 132 prior to opening the secure channel with the web server 120. If the number of secure channels currently open has not reached the maximum number, then the secure channel may be open between the web server 120 and the session key service 130. If the maximum number is reached, then the secure channel may not be open and the sequence may terminate. When the secure channel is open, the web server 120 may send (204) a private key of the web server 120 to the session key service 130 using the secure channel.

A user may enter a uniform resource locator (URL) for a website in the browser on the client devices 110*a*, and the browser may access (208) the website by sending a request to the web server 120 associated with the URL. This may initiate the secure communication protocol (e.g., HTTPS) handshake process with the web server 120. The web server 120 may send (210) the requested website with a public key of the web server 120. The client device 110*a* may generate (212) a session key. Session keys may vary in bytes depending on desired security strength. For example, less secure session keys may be 64 bytes, while more secure session keys may be 128 byes, 192 bytes, 256 bytes, etc. The client device 110*a* may encrypt (214) the session key using the public key of the web server (e.g., extracted from the website). Further, the client device 110*a* may send (216) the public key of the client device 110*a* and the encrypted session key to the web server 120.

The web server 120 may receive and send (218) the public key of the client device 110*a* and the encrypted session key to the session key service 130 using the secure channel. In an implementation, the web server 120 sends the information without decrypting the encrypted session key. The session key service 130 may receive the information and decrypt (220) the encrypted session key to obtain a plaintext session key using the private key of the web server. The session key service 130 may also encrypt (222) the plaintext session key using the public key of the client device 110*a* to generate a second session key. Further, the session key service 130 may send (224) the encrypted second session key to the web server 120 using the secure channel. The web server 120 may send (226) the encrypted second session key to the client device 110*a*. The web server 120 may also store the encrypted session key for use after authentication is complete. It should be noted that the web server 120 may send the encrypted second session key to the client device 110*a* without performing decryption.

The client device 110*a* may receive the encrypted second session key and decrypt (228) it using the private key of the client device 110*a* to obtain a plaintext second session key. The client device 110*a* may also compare the plaintext second session key to the session key previously sent and verify the session keys match. Upon verification, authentication between the client device 110*a* and the web server 120 is complete. As such, the client device 110*a* and the web server 120 may use the verified session key for any subsequent traffic (e.g., requests/responses) to secure communication.

Turning to FIG. 3, the sequence may also begin with the web server 120 and the session key service 130 starting (302) the subscription 132. The web server 120 may open (304) a secure channel (e.g., tunnel) with the session key service 130 in response to the subscription 132 starting. In an implementation, the session key service 130 may identify the metric for the maximum number of secure channels that can be open at a time in the subscription 132 prior to opening the secure channel with the web server 120. If the number of secure channels currently open has not reached the maximum number, then the secure channel may be open between the web server 120 and the session key service 130. If the maximum number is reached, then the secure channel may not be open and the sequence may terminate. When the secure channel is open, the web server 120 may send (304) a private key of the web server 120 to the session key service 130 using the secure channel.

A user may enter a uniform resource locator (URL) for a website in the browser on the client devices 110*a*, and the browser may access (308) the website by sending a request to the web server 120 associated with the URL. This may initiate the secure communication protocol (e.g., HTTPS) handshake process with the web server 120. The web server 120 may send (310) the requested website with a public key of the web server 120. The client device 110*a* may generate (312) a session key (key 1). The session key generated by the client device 110*a* may be of relatively small size (e.g., 64 bytes). The client device 110*a* may encrypt (314) the session key using the public key of the web server (e.g., extracted from the website). Further, the client device 110*a* may send (316) the public key of the client device 110*a* and the encrypted session key to the web server 120.

The web server may receive and send (318) the public key of the client device 110*a* and the encrypted session key to the session key service 130 using the secure channel. In an implementation, the web server 120 sends the information without decrypting the encrypted session key. The session key service 130 may receive the information and decrypt (320) the encrypted session key to obtain a plaintext session key using the private key of the web server. The session key service 130 may generate (322) another session key (key 2). Key 2 may be larger in size than key 1. For example, key 2 may be 128 bytes, which may use higher computing resources to generate than a 64 byte session key. The session key service 130 may also combine (324) the plaintext session key (key 1) and key 2 into a combined session key. Further, the session key service 130 may encrypt (326) the combined session key using the public key of the client device 110*a* to generate an encrypted combined session key.

The session key service 130 may send (328) the encrypted combined session key to the web server 120 using the secure channel. The web server 120 may send (330) the encrypted combined session key to the client device 110. The web server 120 may also store the encrypted combined session key for use after authentication is complete. It should be noted that the web server 120 may send the encrypted combined session key to the client device 110*a* without performing decryption.

The client device 110*a* may receive the encrypted combined session key and decrypt (332) it using the private key of the client device 110*a* to obtain a plaintext combined session key. The client device 110*a* may extract (334) key 1 from the plaintext combined session key and compare (336) the extracted key 1 to the key 1 previously sent and verify the session keys match. Upon verification, authentication between the client device 110a and the web server 120 is complete. As such, the client device 110a and the web server 120 may use the verified combined session key for any subsequent traffic (e.g., requests/responses) to secure communication.

In another implementation, the web server 120 may also generate a session key. For example, the client device 110a may generate a 64 byte session key, the web server 120 may generate a 64 byte session key, and the session key service 130 may generate a 128 byte session key. The session key service 130 may combine all three session keys into a combined session key and encrypt the combined session key as described above. The client device 110a may decrypt the combined session key and extract the session key that the client device 110a generated for verification.

Figure 4:
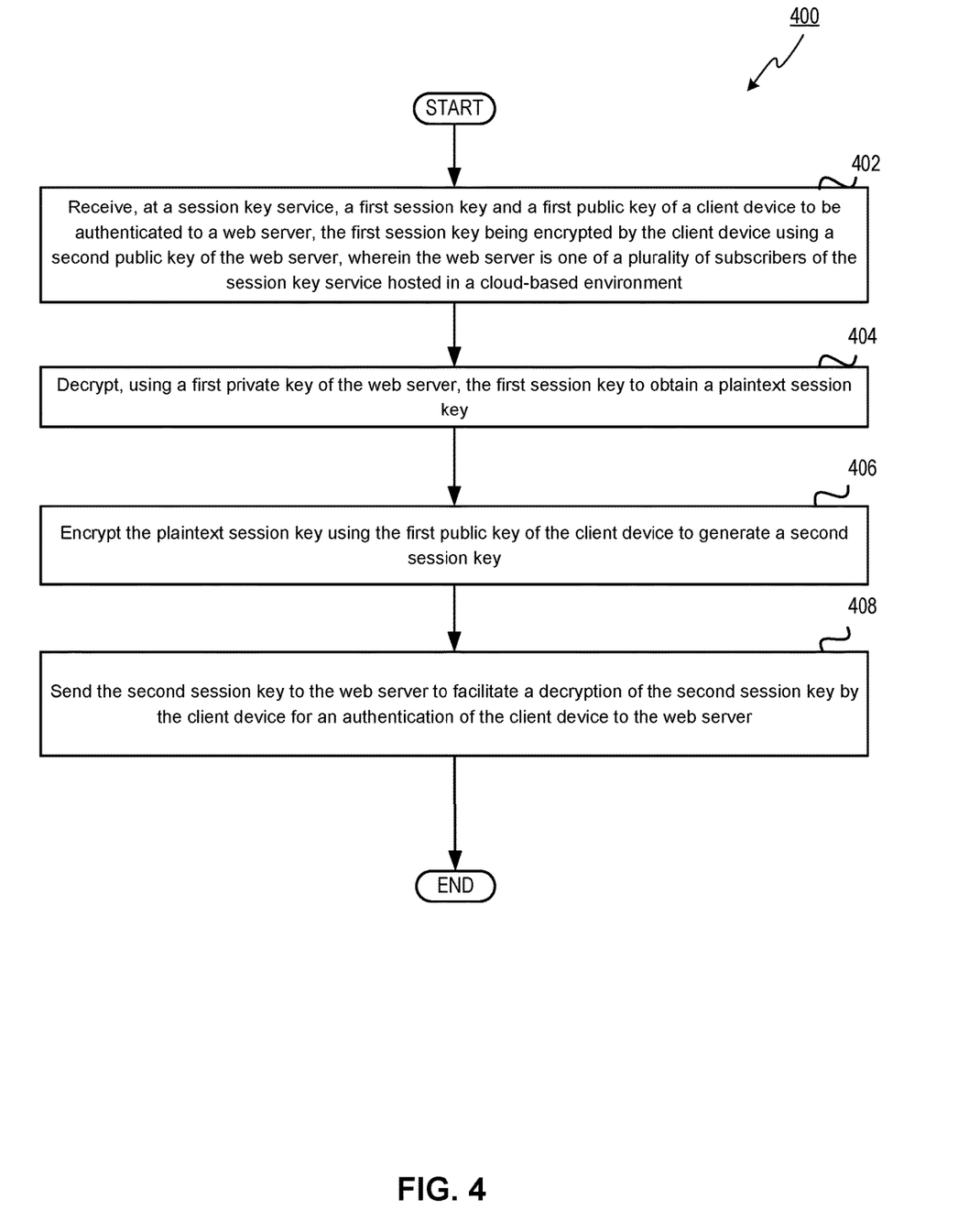
FIG. 4 depicts a flow diagram of an example method for a session key service to exchange session keys with a web server in accordance with one or more aspects of the present disclosure.

FIG. 4 depicts a flow diagram of an example method for a session key service to exchange session keys with a web server in accordance with one or more aspects of the present disclosure. Method 400 and each of its individual functions, routines, subroutines, or operations may be performed by one or more processing devices of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by the session key service 130 executed by one or more processing devices in the cloud-based environment 140.

Method 400 may begin at block 402. At block 402, a processing device may receive, at the session key service 130, a first session key and a first public key of a client device 110a to be authenticated to a web server 120. The first session key and the first public key may be received via a secure channel between the web server 120 and the session key service 130. The first session key may be generated by the client device 110a and encrypted by the client device 110a using a second public key of the web server 120. The web server 120 is one of a number of subscribers of the session key service 130 hosted in the cloud-based environment 140. As previously discussed, the second public key may be obtained by the client device 110a by extracting it from the website sent from the web server 120.

The session key service 130 may fulfill a session key exchange rate specified in a respective subscription 132 for each of the number of subscribers. Further, each subscription 132 may specify a maximum number of secure channels that may be open between the web server 120 and the session key service 130 at a time. Prior to receiving the first session key, the processing device may open a secure channel with the web server 102 in accordance with the subscription 132. In other words, the processing device may open the secure channel if the maximum number of secure channels that can be open at a time is not reached.

At block 404, the processing device may decrypt, using a first private key of the web server 120, the first session key to obtain a plaintext session key. The first private key of the web server 120 may have been sent from the web server 120 to the session key service 130 in response to the subscription 132 starting. The first private key of the web server 120 may be sent via the secure channel.

At block 406, the processing device may encrypt the plaintext session key using the first public key of the client device 110a to generate a second session key. The processing device may send (block 408) the second session key to the web server 120 to facilitate a decryption of the second session key by the client device 110a for an authentication of the client device 110a to the web server 120. For example, the client device 110a verifies the second session key matches the first session key prior to using the second session key in subsequent communications with the web server 120. The web server 120 may forward the first session key from the client device 110a to the session key service 130 without decrypting the first session key and may forward the second session key from the session key service 130 to the client device 110a without decrypting the second session key.

Further, in an another implementation, the processing device may generate, at the session key service 130 after decrypting the first session key to obtain the plaintext session key, a third session key. The processing device may combine the plaintext session key with the third session key into a combined session key, and encrypt the combined session key to generate the second session key. The processing device may proceed with sending the second session key to the web server 102 at block 408.

Figure 5:
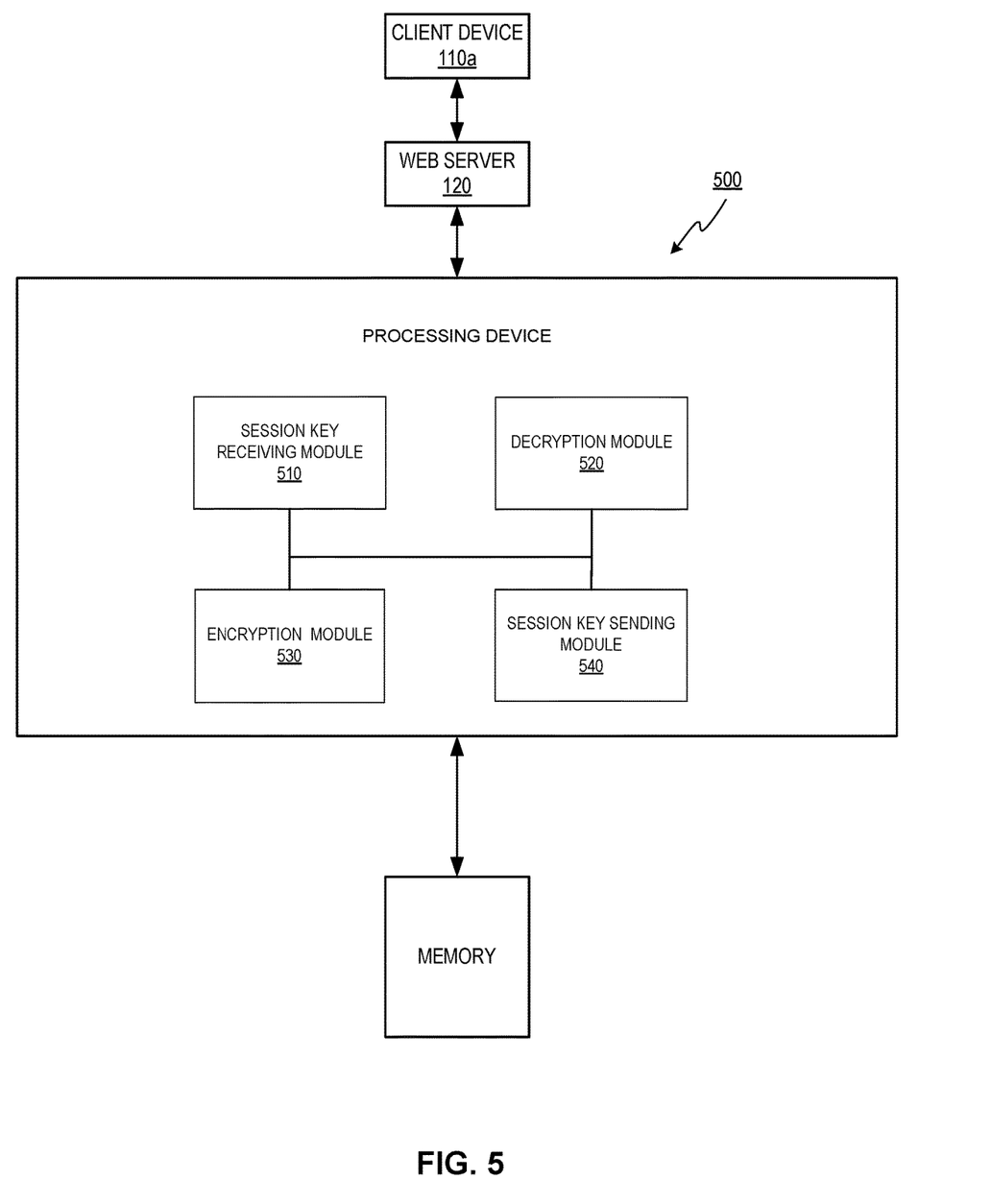
FIG. 5 depicts a block diagram of an example computer system in accordance with one or more aspects of the present disclosure.

FIG. 5 depicts a block diagram of an example computer system 500 in accordance with one or more aspects of the present disclosure. Computer system 500 may be the same or similar to the cloud-based environment 140 and may include one or more processing devices and one or more memory devices. In the example shown, the computer system 500 may be connected to the web server 120 and the web server 120 may be connected to the client device 110a. The client device 110a may communicate with the web server 120 without knowledge of the web server 120 using the session key service 130 for session key exchanges. The computer system 500 may include session key receiving module 510, decryption module 520, encryption module 530, and session key sending module 540.

Session key receiving module 510 may instruct the processing device to receive, at the session key service 130, a first session key and a first public key of the client device 110a to be authenticated to the web server 120. The first session key may be generated and encrypted by the client device 110a using a second public key of the web server 120 prior to the session key service 130 receiving the first session key. The web server 120 is one of a number of subscribers of the session key service 130 hosted in the cloud-based environment 140. A subscription 132 may be maintained by the session key service 130 for each subscriber. The subscription 132 may specify a session key exchange rate and a maximum number of secure channels that can be open at a time.

Decryption module 520 may instruct the processing device to decrypt, using a first private key of the web server 120, the first session key to obtain a plaintext session key. The first private key of the web server 120 may be received from the web server 120 in response to the subscription 132 starting and after a secure channel is open between the web server 120 and the session key service 130.

Encryption module 530 may instruct the processing device to encrypt the plaintext session key using the first public key of the client device to generate a second session key. In some implementations, the plaintext session key may be combined with another session key generated by the session key service 130 into a combined session key, and the encryption module 530 may encrypt the combined session key using the first public key of the client device 110$a$ to generate the second session key.

Session key sending module 540 may instruct the processing device to send the second session key to the web server 120 to facilitate a decryption of the second session key by the client device 110$a$ for an authentication of the client device 110$a$ to the web server 120. The second session key may be sent to the web server 120 via the secure channel.

Figure 6:
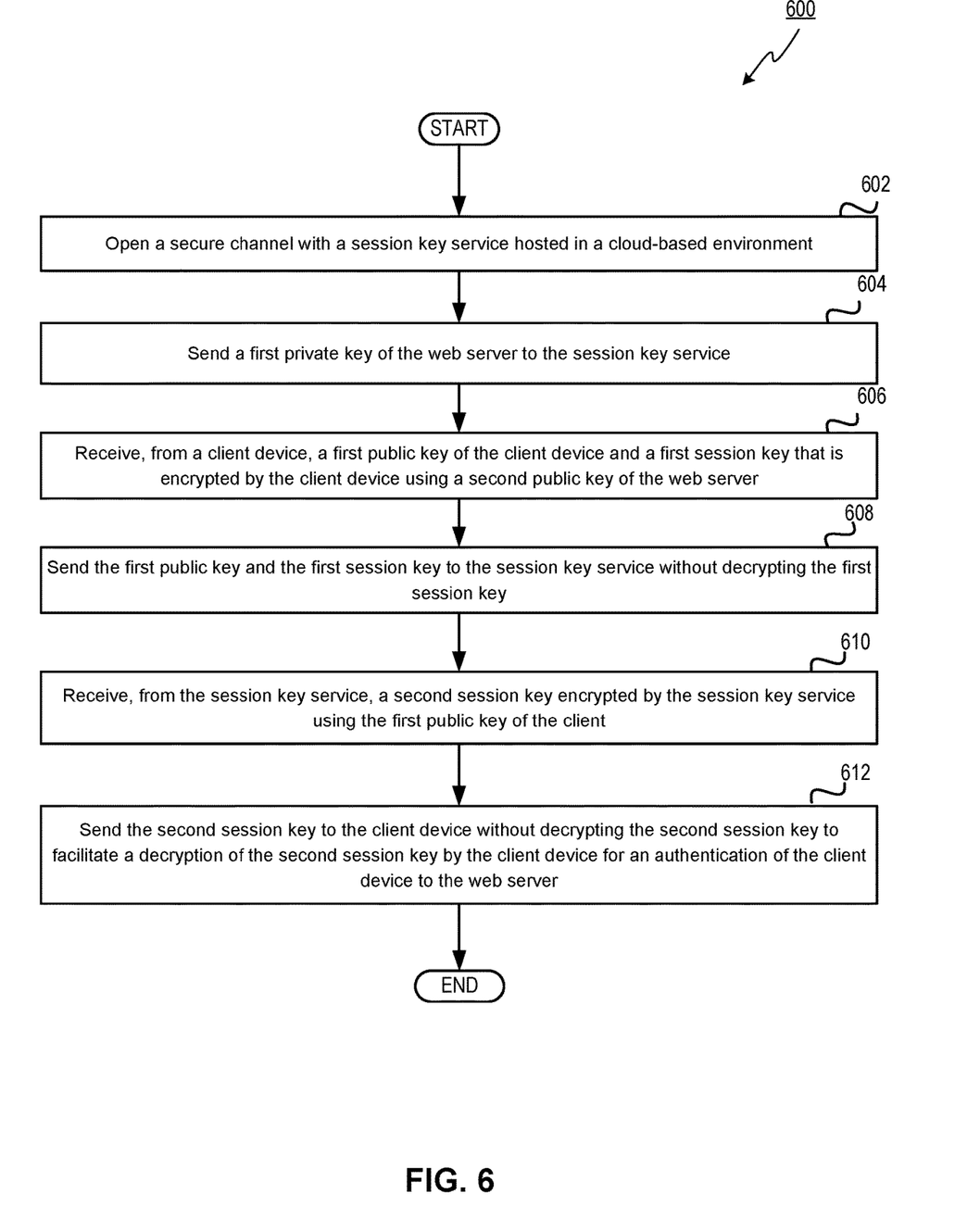
FIG. 6 depicts a flow diagram of example method for a web server that exchanges session keys with a session key service in accordance with one or more aspects of the present disclosure.

FIG. 6 depicts a flow diagram of example method 600 for a web server 120 that exchanges session keys with a session key service 130 in accordance with one or more aspects of the present disclosure. Method 600 may be performed in the same or a similar manner as described above in regards to method 400. Method 600 may be performed by processing devices of the web server 120 and may begin at block 602.

At block 602, a processing device may open a secure channel with a session key service 130 hosted in the cloud-based environment 140. The secure channel may be opened in response to the subscription 132 starting between the web server 120 and the session key service 130. In an implementation, the subscription 132 may specify a maximum number of secure channels that can be open at a time.

At block 604, the processing device may send a first private key of the web server 120 to the session key service 130 using the secure channel. In another implementation, when subscribers (e.g., web servers) do not want to entrust their private key to the session key service 130, the session key service 130 may adopt a homomorphic encryption scheme that enables the session key service 130 to generate session keys without having the private key of the subscriber in plaintext.

At block 606, the processing device may receive, from the client device 110$a$, a first public key of the client device 110$a$ and a first session key that is generated and encrypted by the client device 110$a$ using a second public key of the web server 120. Prior to receiving the first public key of the client device 110$a$ and the first session key, a browser operating on the client device 110$a$ may have requested a website from the web server 120 and the web server 120 provided the website with the public key of the web server 120.

At block 608, the processing device may send the first public key and the first session key to the session key service 130 without decrypting the first session key. The first public key and the first session key may be sent via the secure channel. In an implementation, the session key service 130 may decrypt the encrypted session key using the first private key of the web server 120 to obtain a plaintext session key. The session key service 130 may encrypt the plaintext session key using the first public key of the client device to generate a second session key. In an implementation, the session key service 130 may also generate another session key and combine it with the plaintext session key into a combined session key. The session key service 130 may encrypt the combined session key to generate the second session key.

At block 610, the processing device may receive, from the session key service 130, a second session key encrypted by the session key service 130 using the first public key of the client device 110$a$. The processing device may send (block 612) the second session key to the client device 110$a$ without decrypting the second session key to facilitate a decryption of the second session key by the client device 110$a$ for an authentication of the client device 110$a$ to the web server 120. Once authentication is complete, the client device 110$a$ and the web server 120 may use the second session key in subsequent traffic (e.g., requests/responses) for encryption and decryption of messages.

Figure 7:
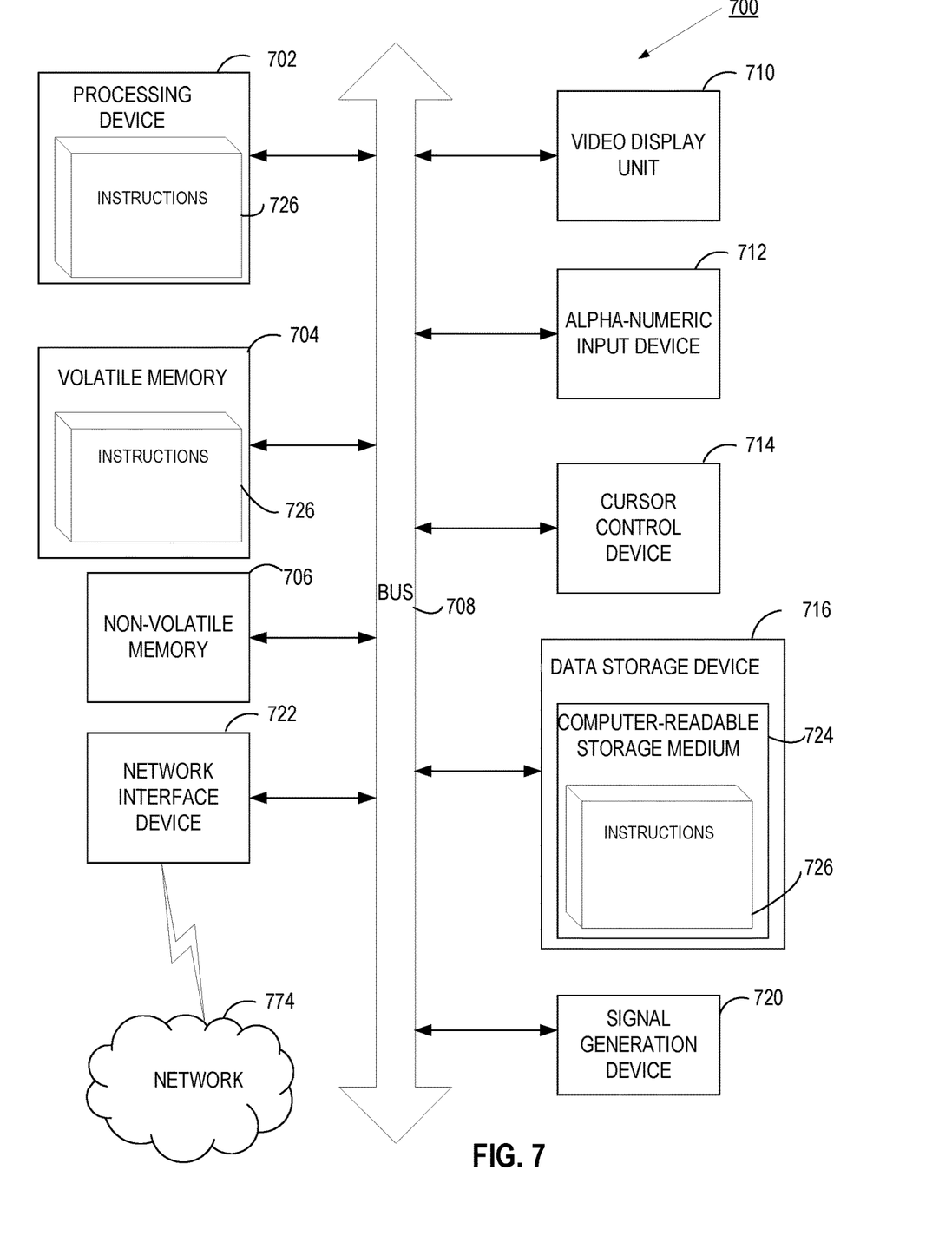
FIG. 7 depicts a block diagram of an illustrative computing system operating in accordance with the examples of the present disclosure.

FIG. 7 depicts a block diagram of an illustrative computing system 700 operating in accordance with the examples of the present disclosure. In various illustrative examples, computer system 700 may correspond to a component of the cloud-based environment 140 or the web server 120 of FIG. 1. In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, as a peer computer in a peer-to-peer or distributed network environment, or as one or more servers in a cloud-based environment 140. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 a non-volatile memory 706 or electrically-erasable programmable ROM (EEPROM)), and a data storage device 716, which may communicate with each other via a bus 708. In some examples, the subscriptions 132 may be stored in any suitable memory depicted in the computer system 700.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. In an example, the network interface device 722 may include a network interface controller (NIC). Computer system 700 also may include a video display unit 710 (e.g., an LCD, plasma, etc.), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 400 or 600, aspects of the sequence diagrams 200 and 300, and for encoding the session key service 130 illustrated in FIG. 1.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "determining," "causing," "initiating," "updating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and/or 600 and each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving, at a session key service, a first encrypted plaintext session key and a first public key of a client device to be authenticated to a web server, the first encrypted plaintext session key being a first plaintext session key that is encrypted by the client device using a second public key of the web server, wherein the web server is one of a plurality of subscribers of the session key service hosted in a cloud-based environment;
    decrypting, using a first private key of the web server, the first encrypted plaintext session key to obtain a first decrypted plaintext session key;
    encrypting the first decrypted plaintext session key using the first public key of the client device to generate a second encrypted plaintext session key; and
    sending the second encrypted plaintext session key to the web server to facilitate a decryption of the second encrypted plaintext session key by the client device into a second decrypted plaintext session key for an authentication of the client device to the web server, wherein the second decrypted plaintext session key is to be compared with the first plaintext session key to determine whether the second decrypted plaintext session key matches the first plaintext session key, prior to using the second decrypted plaintext session key in subsequent communications of the client device with the web server.

2. The method of claim 1, wherein each of the plurality of subscribers has a subscription with the session key service, the subscription specifies a session key exchange rate for the session key service to fulfill.

3. The method of claim 1, further comprising:
    receiving, at the session key service, the first private key of the web server from the web server in response to starting a subscription with the web server.

4. The method of claim 1, wherein the second encrypted plaintext session key is to be forwarded by the web server to the client device without decrypting the second encrypted plaintext session key.

5. The method of claim 1, further comprises:
    generating, at the session key service after decrypting the first encrypted plaintext session key to obtain the first decrypted plaintext session key, a third plaintext session key;
    combining the first decrypted plaintext session key with the third plaintext session key into a combined plaintext session key; and
    encrypting the combined plaintext session key to generate the second encrypted plaintext session key.

6. The method of claim 1, further comprising, prior to receiving the first encrypted plaintext session key, opening a secure channel with the web server for client device in accordance with a subscription, wherein the subscription specifies a maximum number of secure channels that can be open at a time.

7. The method of claim 1, wherein the first plaintext session key was generated by the client device and provided to the session key service via the web server.

8. A system comprising:
a memory;
a processing device hosting a session key service in a cloud-based environment, the processing device operatively coupled to the memory, the processing device to:
receive, at a session key service, a first encrypted plaintext session key and a first public key of a client device to be authenticated to a web server, the first encrypted plaintext session key being a first plaintext session key that is encrypted by the client device using a second public key of the web server, wherein the web server is one of a plurality of subscribers of the session key service hosted in a cloud-based environment;
decrypt, using a first private key of the web server, the first encrypted plaintext session key to obtain a first decrypted plaintext session key;
encrypt the first decrypted plaintext session key using the first public key of the client device to generate a second encrypted plaintext session key; and
send the second encrypted plaintext session key to the web server to facilitate a decryption of the second encrypted plaintext session key by the client device into a second decrypted plaintest session key for an authentication of the client device to the web server, wherein the second decrypted plaintext session key is to be compared with the first plaintext session key to determine whether the second decrypted plaintext session key matches the first plaintext session key, prior to using the second decrypted plaintext session key in subsequent communications of the client device with the web server.

9. The system of claim 8, wherein the processing device further to:
generate, at the session key service after decrypting the first encrypted plaintext session key to obtain the first decrypted plaintext session key, a third plaintext session key;
combine the first decrypted plaintext session key with the third plaintext session key into a combined plaintext session key; and
encrypt the combined plaintext session key to generate the second encrypted plaintext session key.

10. The system of claim 8, wherein each of the plurality of subscribers has a subscription with the session key service, the subscription specifies a session key exchange rate for the session key service to fulfill.

11. The system of claim 8, wherein the processing device further to:
receive, at the session key service, the first private key of the web server from the web server in response to starting a subscription with the web server.

12. The system of claim 8, wherein the processing device further to, prior to receiving the first encrypted plaintext session key, open a secure channel with the web server for the client device in accordance with a subscription of the web server to the session key service, wherein the subscription specifies a maximum number of secure channels that can be open at a time.

13. A non-transitory machine-readable storage medium storing instructions that cause a processing device of a web server to:

open a secure channel with a session key service hosted in a cloud-based environment;
send a first private key of the web server to the session key service;
receive, from a client device, a first public key of the client device and a first encrypted plaintext session key that is a first plaintext session key encrypted by the client device using a second public key of the web server;
send the first public key and the first encrypted plaintext session key to the session key service without decrypting the first encrypted plaintext session key;
receive, from the session key service, a second encrypted plaintext session key encrypted by the session key service using the first public key of the client device; and
send the second encrypted plaintext session key to the client device without decrypting the second encrypted plaintext session key to facilitate a decryption of the second encrypted plaintext session key by the client device into a second decrypted plaintext session key for an authentication of the client device to the web server, wherein the second decrypted plaintext session key is to be compared with the first plaintext session key to determine whether the second decrypted plaintext session key matches the first plaintext session key, prior to using the second decrypted plaintext session key in subsequent communications of the client device with the web server.

14. The non-transitory machine-readable storage medium of claim 13, wherein the secure channel is open in response to subscribing to the session key service.

15. The non-transitory machine-readable storage medium of claim 13, wherein the second encrypted plaintext session key was generated by the session key service by:
generating a third plaintext session key;
combining the third plaintext session key with a first decrypted plaintext session key after decrypting the first encrypted plaintext session key with the first private key of the web server to form a combined plaintext session key; and
encrypting the combined plaintext session key using the first public key of the client device to generate the second encrypted plaintext session key.

16. The non-transitory machine-readable storage medium of claim 13, wherein the second encrypted plaintext session key is decrypted by the client device using a second private key of the client device.

17. The non-transitory machine-readable storage medium of claim 13, wherein the second encrypted plaintext session key is received from the session key service in accordance with a subscription of the web server to the session key service, wherein the subscription specifies a session key exchange rate for the session key service.

18. The non-transitory machine-readable storage medium of claim 13, wherein the first private key of the web server is sent in response to starting a subscription with the session key service, wherein the subscription specifies one or more of a session key exchange rate for the session key service or a maximum number of secure channels between the session key service and the web server that can be open at a time.

19. The non-transitory machine-readable storage medium of claim 13, comprising, prior to receiving the first encrypted plaintext session key, opening a secure channel with the session key service based at least on a subscription to the session key service that specifies a maximum number of secure channels between the web server and the session key service that can be open at a time.

* * * * *